US011878395B2

(12) United States Patent
Chiang

(10) Patent No.: US 11,878,395 B2
(45) Date of Patent: Jan. 23, 2024

(54) TORQUE TOOL

(71) Applicant: William Tools Co., Ltd., Taichung (TW)

(72) Inventor: Shui-Lai Chiang, Taichung (TW)

(73) Assignee: WILLIAM TOOLS CO., LTD., Taichung (TW)

( * ) Notice: Subject to any disclaimer, the term of this patent is extended or adjusted under 35 U.S.C. 154(b) by 0 days.

(21) Appl. No.: 17/958,956

(22) Filed: Oct. 3, 2022

(65) Prior Publication Data

US 2023/0191570 A1 Jun. 22, 2023

(30) Foreign Application Priority Data

Dec. 16, 2021 (TW) ................................ 110147267

(51) Int. Cl.
*B25B 23/142* (2006.01)
*B25B 15/04* (2006.01)

(52) U.S. Cl.
CPC .......... *B25B 23/1427* (2013.01); *B25B 15/04* (2013.01)

(58) Field of Classification Search
CPC .............. B25B 23/1414; B25B 23/142; B25B 23/1427; B25B 15/04
USPC ............................................................ 81/472
See application file for complete search history.

(56) References Cited

FOREIGN PATENT DOCUMENTS

DE 102004061482 B4 * 9/2020 ............. B25B 15/02

OTHER PUBLICATIONS

Machine Translation of DE102004061482 B4 (Year: 2020).*

* cited by examiner

*Primary Examiner* — Don M Anderson
*Assistant Examiner* — Robert C Moore
(74) *Attorney, Agent, or Firm* — Muncy, Geissler, Olds & Lowe, P.C.

(57) ABSTRACT

A torque tool is provided, including: a main body, a driving portion, a torque mechanism and an adjusting mechanism. The main body defines an axial direction. The driving portion is disposed on an end of the main body. The torque mechanism is non-rotatably disposed within the main body. The adjusting mechanism includes a plurality of first engaging portions disposed on the main body and an adjusting member rotatably disposed on the main body, and the adjusting member includes a plurality of second engaging portions releasably engaged with the plurality of first engaging portions. The main body defines a center line parallel to the axial direction, and as viewed in the axial direction, hypothetical lines extending between the plurality of second engaging portions and the center line define a plurality of included angles, and at least two of the plurality of included angles have different angle sizes.

10 Claims, 6 Drawing Sheets

TORQUE TOOL

BACKGROUND OF THE INVENTION

Field of the Invention

The present invention relates to a torque tool.

Description of the Prior Art

A torque tool capable of adjusting torque setting value is usually used in fastening or unfastening fasteners, which can avoid problems such as damage to the object or the fastener due to over-tightening. A working portion is provided at one end of a main body of the torque tool, a torque adjusting shaft is provided in the main body to adjust the torque setting value, a rotatable adjusting member is installed at the other end of the main body, and the rotatable adjusting member is screwed with the torque adjusting shaft. When turning the rotatable adjusting member, the torque adjustment shaft is driven by the rotatable adjusting member to move axially, thereby adjusting the torque setting value.

However, the rotatable adjusting member of a conventional torque tool is screwed with the main body and cannot be accurately positioned after adjustment. In addition, the rotatable adjusting member is disposed on an end of the main body opposite to the working portion, which is inconvenient to be operated intuitively.

The present invention is, therefore, arisen to obviate or at least mitigate the above-mentioned disadvantages.

SUMMARY OF THE INVENTION

The main object of the present invention is to provide a torque tool, which is convenient to operate and adjust a predetermined torque.

To achieve the above and other objects, the present invention provides a torque tool, including: a main body, a driving portion, a torque mechanism and an adjusting mechanism. The main body defines an axial direction. The driving portion is disposed on an end of the main body and is freely rotatable when receiving a torque larger than a predetermined torque. The torque mechanism is non-rotatably disposed within the main body along the axial direction. The adjusting mechanism includes a plurality of first engaging portions disposed on the main body and an adjusting member rotatably disposed on the main body. The adjusting member is abutted against the torque mechanism and includes a plurality of second engaging portions releasably engaged with the plurality of first engaging portions, and the adjusting member is axially movable relative to the main body to adjust the predetermined torque of the driving portion when the adjusting member is rotated relative to the main body. A number of the plurality of second engaging portions is odd. The main body further defines a center line parallel to the axial direction. As viewed in the axial direction, hypothetical lines extending between the plurality of second engaging portions and the center line define a plurality of included angles, and at least two of the plurality of included angles have different angle sizes. As viewed in the axial direction, one of the plurality of second engaging portions and the center line define a symmetry axis vertical to the center line, and the plurality of second engaging portions are symmetrically arranged on a circumferential wall of the adjusting member relative to the symmetry axis.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
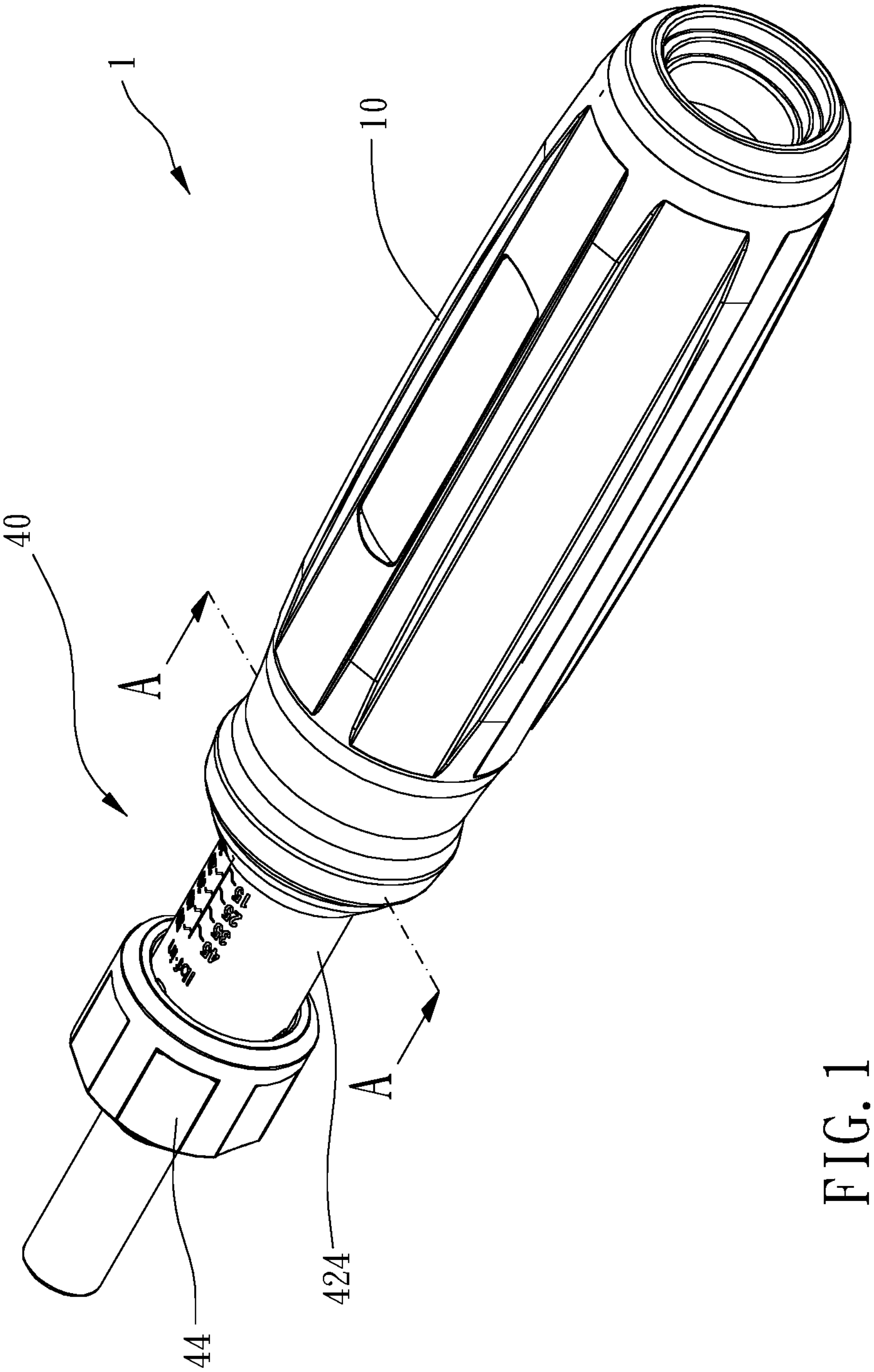
FIG. 1 is a stereogram of a preferable embodiment of the present invention.
Figure 2:
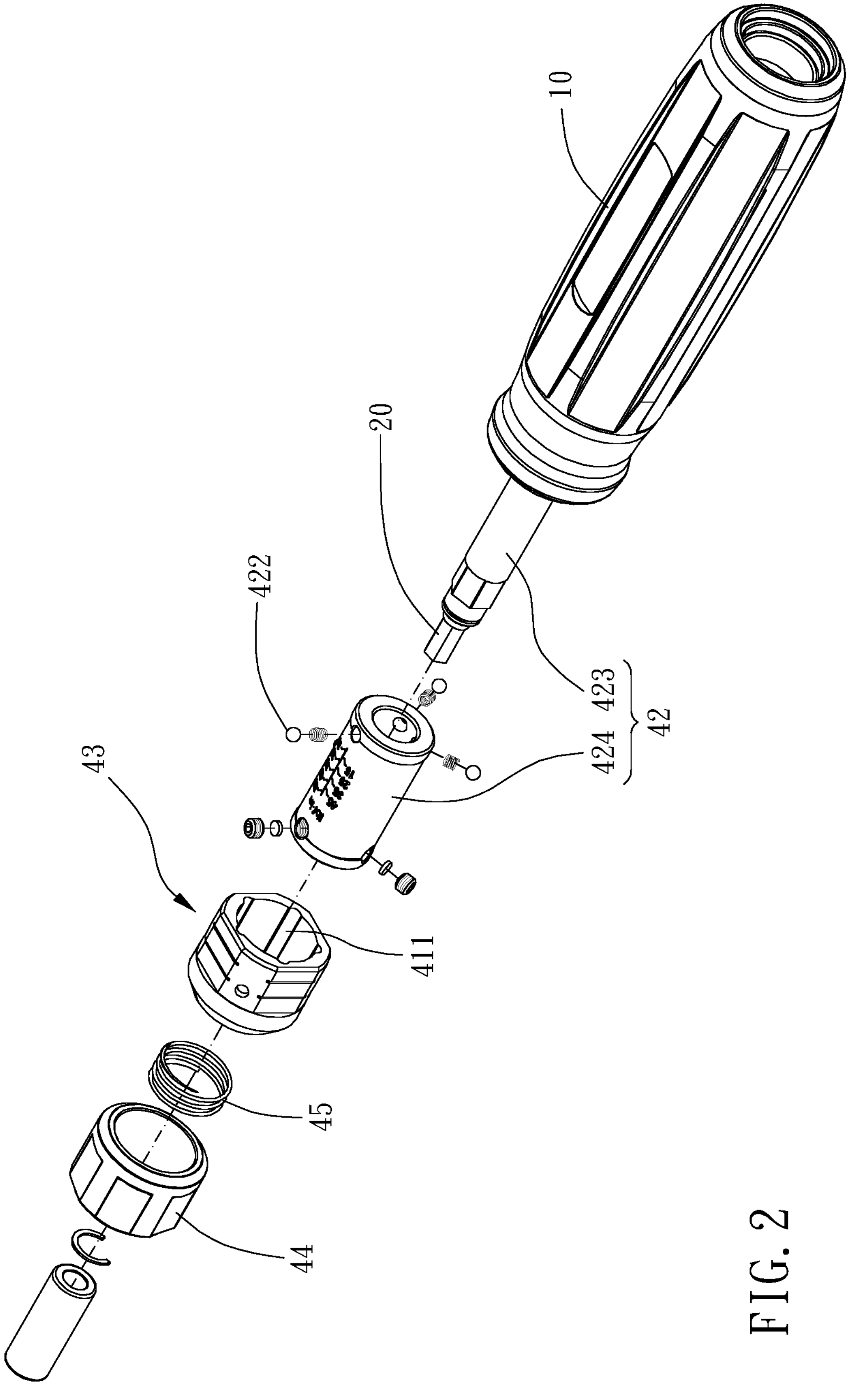
FIG. 2 is a breakdown drawing of a preferable embodiment of the present invention.
Figure 3:
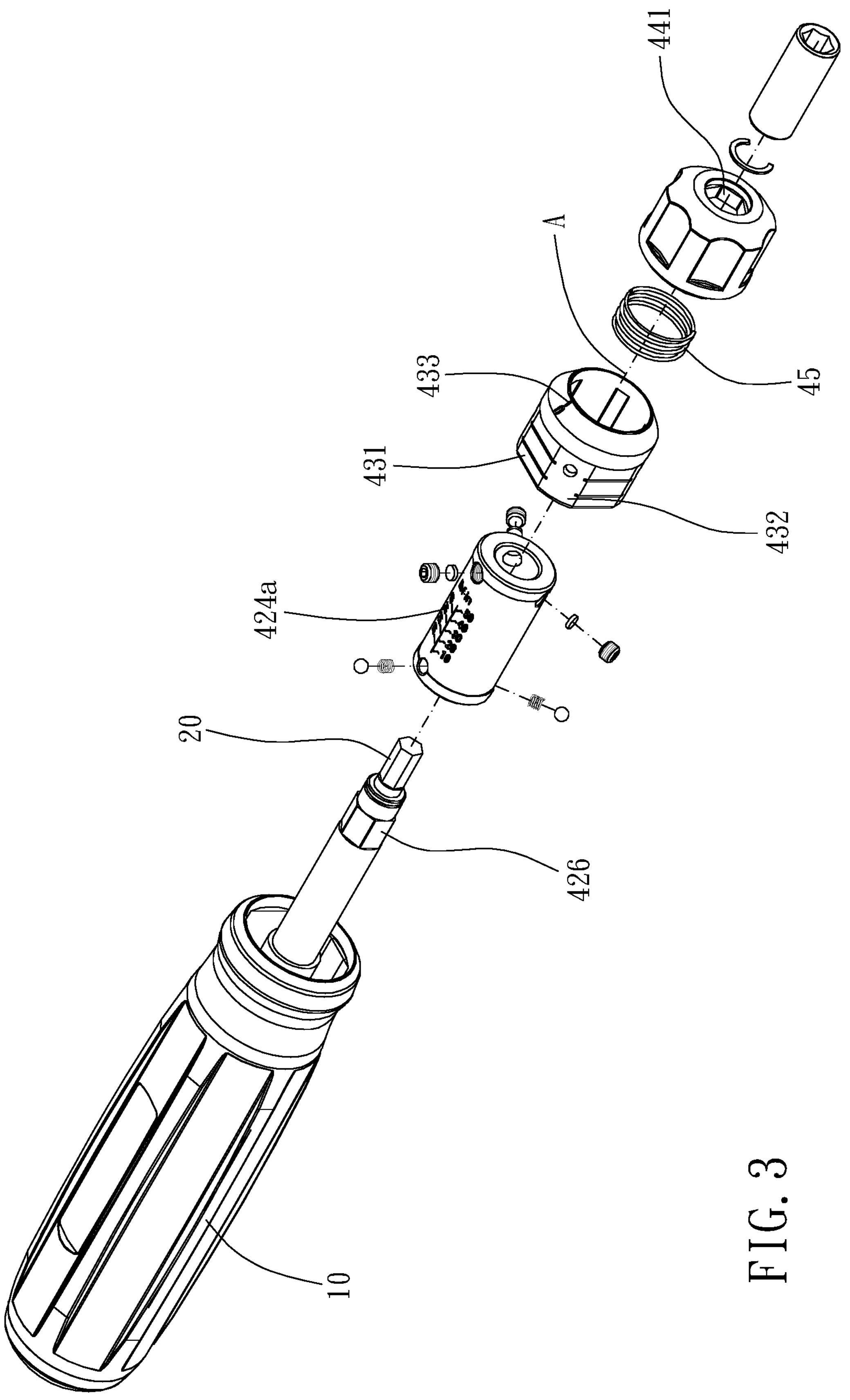
FIG. 3 is a breakdown drawing of a preferable embodiment of the present invention as viewed from another perspective.
Figure 4:
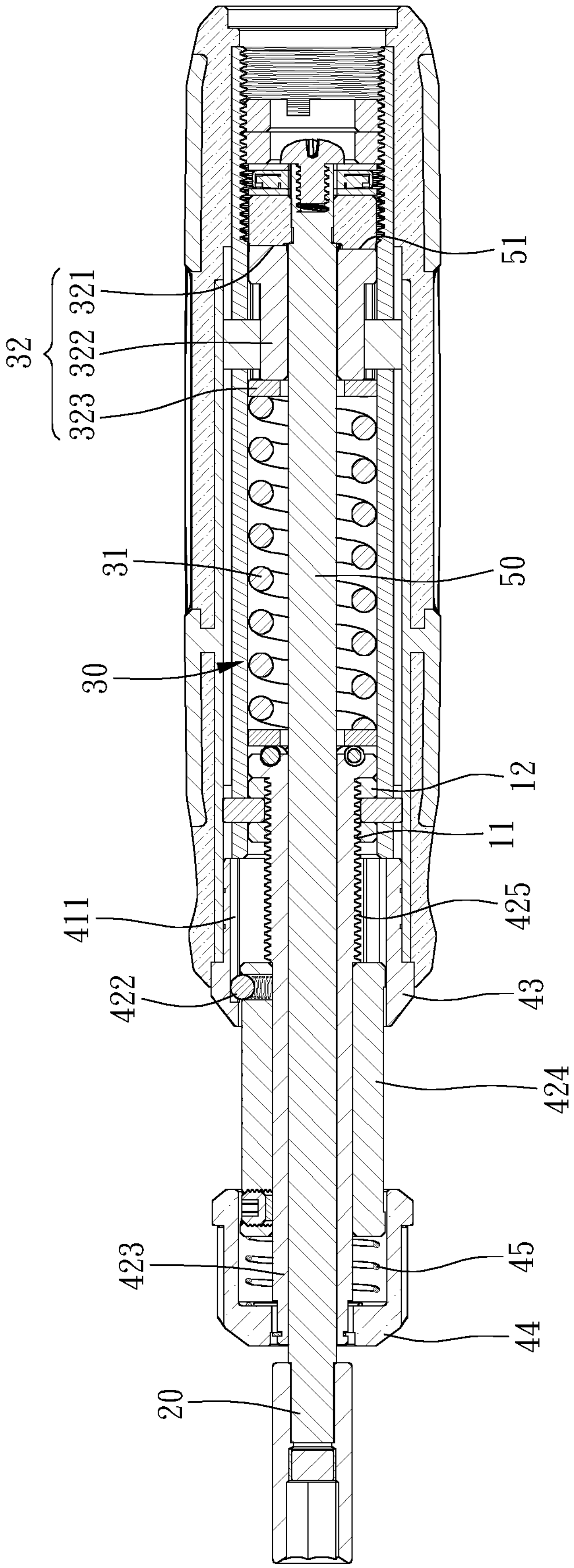
FIG. 4 is a cross-sectional view of a preferable embodiment of the present invention.
Figure 5:
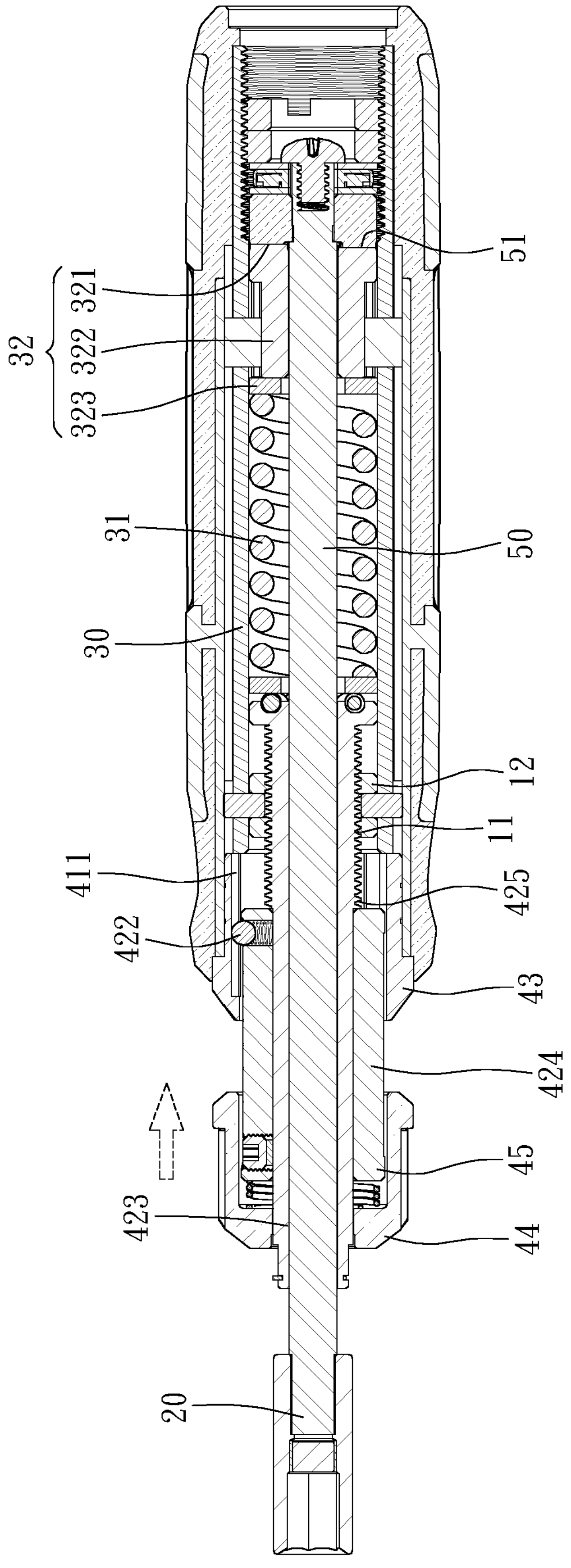
FIG. 5 is a drawing showing operation of a preferable embodiment of the present invention.

Please refer to FIGS. 1 to 6 for a preferable embodiment of the present invention. A torque tool 1 of the present invention includes a main body 10, a driving portion a torque mechanism 30 and an adjusting mechanism 40.

The main body 10 defines an axial direction A. The driving portion 20 is disposed on an end of the main body 10 and is freely rotatable when receiving a torque larger than a predetermined torque. The torque mechanism 30 is non-rotatably disposed within the main body 10 along the axial direction A. The adjusting mechanism 40 includes a plurality of first engaging portions 41 disposed on the main body 10 and an adjusting member 42 rotatably disposed on the main body 10. The adjusting member 42 is abutted against the torque mechanism 30 and includes a plurality of second engaging portions 421 releasably engaged with the plurality of first engaging portions 41. The adjusting member 42 is axially movable relative to the main body 10 to adjust the predetermined torque of the driving portion 20 when the adjusting member 42 is rotated relative to the main body 10. The main body 10 further defines a center line C parallel to the axial direction A. As viewed in the axial direction A, hypothetical lines H extending between the plurality of second engaging portions 421 and the center line C define a plurality of included angles, and at least two of the plurality of included angles have different angle sizes. Therefore, the plurality of first engaging portions 41 and the plurality of second engaging portions 421 are stably engaged with one another and provide different radial forces in different directions to facilitate the operation of the adjusting member 42.

Figure 6:
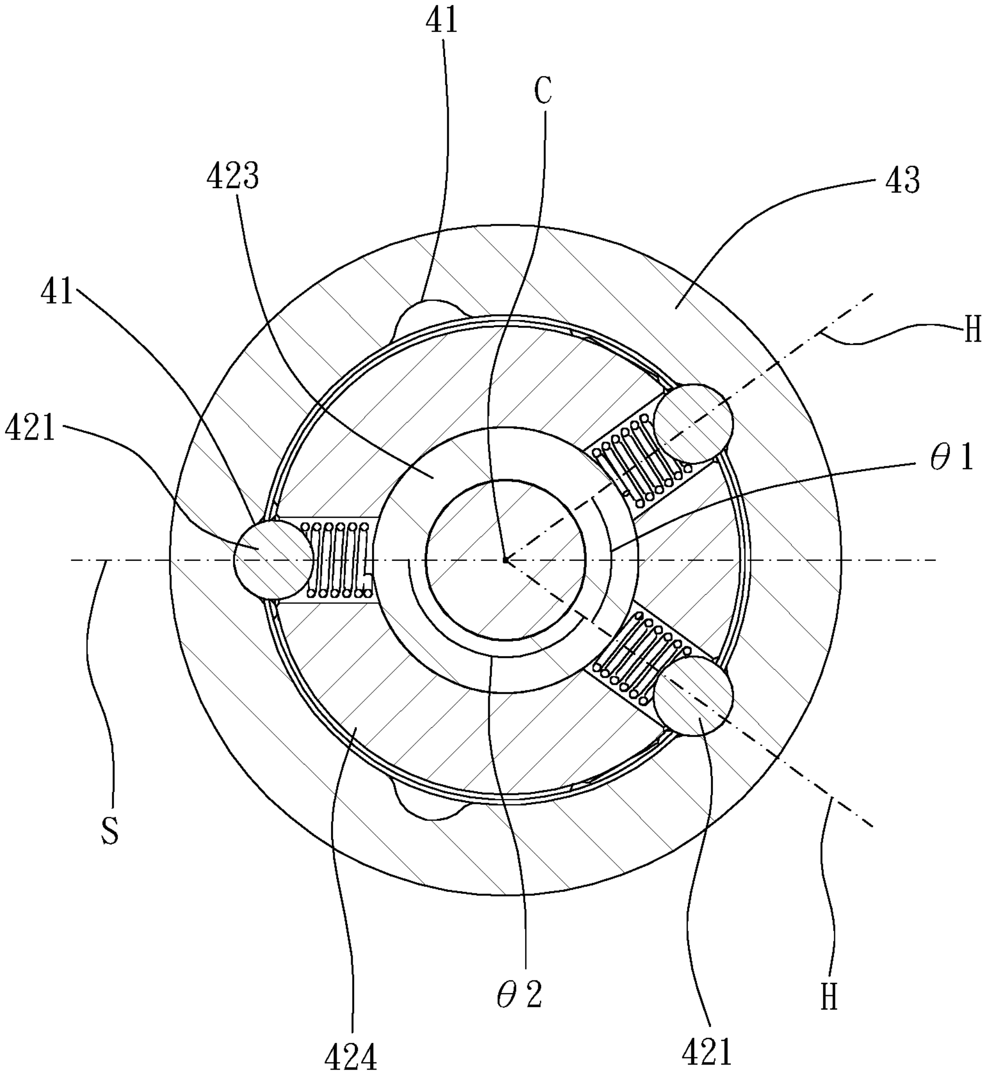
FIG. 6 is a cross-sectional view taken along A-A line in FIG. 1.

The plurality of included angles include at least one first included angle θ1 and at least one second included angle θ2 larger than the at least one first included angle θ1. Each of the at least one first included angle θ1 is an acute angle, and each of the at least one second included angle θ2 is an obtuse angle. As viewed in the axial direction A, one of the plurality of second engaging portions 421 and the center line C define a symmetry axis S vertical to the center line C, and the plurality of second engaging portions 421 are symmetrically arranged on a circumferential wall of the adjusting member 42 relative to the symmetry axis S. Therefore, the plurality of second engaging portions 421 provide urging forces of opposite directions and different magnitudes on the symmetry axis S, which avoids dislocation of the adjusting member 42 and allows smooth operation. A number of the plurality of first engaging portions 41 is odd and larger than the number of the plurality of second engaging portions 421, and the number of the plurality of second engaging portions 421 is odd. As shown in FIG. 6, in this embodiment, the number of the plurality of second engaging portions 421 is 3, and the plurality of included angles includes one said first included angle θ1 of 72 degrees and two said second included angles θ2 of 144 degrees. In operation, each of the plurality of first engaging portions 41 is stably engaged with one of the plurality of second engaging portions 421; during adjustment, one of the plurality of second engaging portions 421 with a smaller urging force is easier to be disengaged from one of the plurality of first engaging portions 41 for easy rotation and adjustment. In other embodiments, the number of the plurality of second engaging portions and angle sizes of each said first included angle and each said second included angle are changeable according to different requirements.

The torque tool 1 further includes a mandrel 50 penetrating within and connecting the main body 10, the torque mechanism 30 and the adjusting mechanism and an end of the mandrel 50 protruding beyond the main body 10 has the driving portion 20 disposed thereon. The adjusting member 42 includes an axial sleeve 423 abutted against the torque mechanism 30 and a positioning member 424 immovably connected with the axial sleeve 423. The positioning member 424 has the plurality of second engaging portions 421 disposed thereon, the main body 10 includes a first threaded portion 11, and the axial sleeve 423 includes a second threaded portion 425 screwed on the first threaded portion 11. The torque mechanism 30 further includes a first elastic member 31 sleeved to the mandrel 50, and an end of the axial sleeve 423 is abuttable against the first elastic member 31 (directly or indirectly) to compress the first elastic member 31. Please refer to FIGS. 4 and 5, in this embodiment, the main body 10 has a connecting member 12 immovably disposed therein, and the first threaded portion 11 is disposed on the connecting member 12, which is convenient to be processed. When the positioning member 424 drives the axial sleeve 423 to rotate relative to the main body 10, the axial sleeve 423 is axially moved relative to the first threaded portion 11 via the second threaded portion 425 so as to compress or release the first elastic member 31 to adjust the predetermined torque, which has a simple structure and is easy to operate.

Preferably, the adjusting mechanism 40 is located between the main body 10 and the driving portion 20 and further includes a restricting sleeve 43 mounted to the main body 10, and the plurality of first engaging portions 41 are equiangularly arranged on an inner circumferential wall of the restricting sleeve 43, which is easy to process and allows to adjust the predetermined torque quantitatively. In this embodiment, the number of the plurality of first engaging portions 41 is 5 so as to correspond to the plurality of second engaging portions 421; each of the plurality of first engaging portions 41 includes an engaging slot 411 extending in the axial direction A, and each of the plurality of second engaging portions 421 includes an engaging member 422 radially retractable and protruding from the adjusting member 42, which has a simple structure and provides stable engagement. Specifically, an outer circumferential wall of the restricting sleeve 43 has a plurality of cutting surfaces 431 corresponding to an inner circumferential surface of the main body 10, and every adjacent two of the plurality of cutting surfaces 431 have an arcuate surface 432 disposed therebetween. Therefore, the restricting sleeve 43 is non-rotatable relative to the main body 10 and has a sufficient thickness so as to have stable assembling with the main body 10 and good structural strength. At least one of the plurality of cutting surfaces 431 and said arcuate surfaces 432 has an anti-slip structure disposed thereon, such as embossing, ribs or grooves, so as to provides good assembling stability or allow adhesive to attach thereon. The positioning member 424 includes a first indication portion 424*a*, and the restricting sleeve 43 includes a second indication portion 433 exposed out of the main body 10 and corresponding to the first indication portion 424*a* for precise adjustment of the predetermined torque. However, the plurality of first engaging portions may be recessed on the main body; the number of the plurality of first engaging portions may be changed according to different requirements; each of the plurality of first engaging portions may be an engaging recess, and each of the plurality of second engaging portions may be an engaging projection.

An end of the mandrel 50 remote from the driving portion 20 has a first ratchet portion 51 non-rotatably disposed thereon, and the first ratchet portion 51 is rotatably disposed within the main body 10. The torque mechanism 30 includes an abutting assembly 32 being axially movable relative to the main body 10, and the abutting assembly 32 is non-rotatable relative to the main body 10 and has a second ratchet portion 321 being engageable with the first ratchet portion 51. In this embodiment, the abutting assembly 32 includes a moving member 322 having the second ratchet portion 321 disposed thereon, and the moving member 322 is axially movable relative to the main body 10 and is located at a side of the first elastic member 31 opposite to the axial sleeve 423. When a torque larger than the predetermined torque is exerted on the driving portion 20, the second ratchet portion 321 is subjected to a rotational moment greater than an elastic force of the first elastic member 31 and drives the moving member 322 to compress the first elastic member 31 and axially move relative to the first ratchet portion 51, and the first ratchet portion 51 is disengaged from the second ratchet portion 321 and idles. Preferably, the abutting assembly 32 further includes two spacers 323 abutted against two opposite ends of the first elastic member 31 for good abutment stability, and each of the two spacers 323 may be made of metal, silicone, rubber or plastic.

The adjusting mechanism 40 further includes an operating member 44 sleeved with the adjusting member 42. The adjusting member 42 includes a first restricting portion 426, and the operating member 44 includes a second restricting portion 441 and is movable in the axial direction A between a locked position and an unlocked position relative to the adjusting member 42. When the operating member 44 is in the locked position, the first restricting portion 426 is abutted against the second restricting portion 441 in a rotational direction of the adjusting member 42, and the operating member 44 is rotatable to drive the axial sleeve 423 to rotate and adjust the predetermined torque, which is convenient to handle and laborsaving. When the operating member 44 is in the unlocked position, the first restricting portion 426 is free of interference with the second restricting portion 441 in the rotational direction so as to avoid unexpected rotation of the axial sleeve 423 during operating the torque tool 1. In this embodiment, the first restricting portion 426 is a non-circular segment disposed on the axial sleeve 423, and the second restricting portion 441 is a non-circular hole disposed on the operating member 44, which has a simple structure and is easy to process. A second elastic member 45 is disposed between the operating member 44 and the positioning member 424 so that the operating member 44 has a tendency to move in a direction toward the unlocked position; the operating member 44 is partially sleeved with the positioning member 424 to provide guiding effect for smooth operation.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A torque tool, including:

a main body, defining an axial direction;

a driving portion, disposed on an end of the main body, being freely rotatable when receiving a torque larger than a predetermined torque;

a torque mechanism, non-rotatably disposed within the main body along the axial direction; and an adjusting mechanism, including a plurality of first engaging portions disposed on the main body and an adjusting member rotatably disposed on the main body, the adjusting member abutted against the torque mechanism and including a plurality of second engaging portions releasably engaged with the plurality of first engaging portions, the adjusting member being axially movable relative to the main body to adjust the predetermined torque of the driving portion when the adjusting member is rotated relative to the main body;

wherein a number of the plurality of second engaging portions is odd; the main body further defines a center line parallel to the axial direction, as viewed in the axial direction, hypothetical lines extending between the plurality of second engaging portions and the center line define a plurality of included angles, and at least two of the plurality of included angles have different angle sizes; as viewed in the axial direction, one of the plurality of second engaging portions and the center line define a symmetry axis vertical to the center line, and the plurality of second engaging portions are symmetrically arranged on a circumferential wall of the adjusting member relative to the symmetry axis.

2. The torque tool of claim 1, wherein each of the plurality of first engaging portions includes an engaging slot extending in the axial direction, and each of the plurality of second engaging portions includes an engaging member radially retractable and protruding from the adjusting member.

3. The torque tool of claim 1, wherein a number of the plurality of first engaging portions is odd and larger than the number of the plurality of second engaging portions.

4. The torque tool of claim 1, wherein the adjusting member includes an axial sleeve abutted against the torque mechanism and a positioning member immovably connected with the axial sleeve, the positioning member has the plurality of second engaging portions disposed thereon, the main body includes a first threaded portion, and the axial sleeve includes a second threaded portion screwed on the first threaded portion.

5. The torque tool of claim 1, wherein the adjusting mechanism is located between the main body and the driving portion and further includes a restricting sleeve mounted to the main body, and the plurality of first engaging portions are equiangularly arranged on an inner circumferential wall of the restricting sleeve.

6. The torque tool of claim 1, wherein the adjusting mechanism further includes an operating member sleeved with the adjusting member, the adjusting member includes a first restricting portion, the operating member includes a second restricting portion and is movable in the axial direction between a locked position and an unlocked position relative to the adjusting member; when the operating member is in the locked position, the first restricting portion is abutted against the second restricting portion in a rotational direction of the adjusting member; and when the operating member is in the unlocked position, the first restricting portion is free of interference with the second restricting portion in the rotational direction.

7. The torque tool of claim 1, further including a mandrel penetrating within and connecting the main body, the torque mechanism and the adjusting mechanism, wherein an end of the mandrel protruding beyond the main body has the driving portion disposed thereon.

8. The torque tool of claim 7, wherein an end of the mandrel remote from the driving portion has a first ratchet portion non-rotatably disposed thereon, the first ratchet portion is rotatably disposed within the main body, the torque mechanism includes an abutting assembly being axially movable relative to the main body, and the abutting assembly is non-rotatable relative to the main body and has a second ratchet portion being engageable with the first ratchet portion.

9. The torque tool of claim 1, wherein the plurality of included angles includes at least one first included angle and at least one second included angle larger than the at least one first included angle, each of the at least one first included angle is an acute angle, and each of the at least one second included angle is an obtuse angle.

10. The torque tool of claim 8, wherein each of the plurality of first engaging portions includes an engaging slot extending in the axial direction, and each of the plurality of second engaging portions includes an engaging member radially retractable and protruding from the adjusting member; the adjusting member includes an axial sleeve abutted against the torque mechanism and a positioning member immovably connected with the axial sleeve, the positioning member has the plurality of second engaging portions disposed thereon, the main body includes a first threaded portion, and the axial sleeve includes a second threaded portion screwed on the first threaded portion; the main body has a connecting member immovably disposed therein, the first threaded portion is disposed on the connecting member; the torque mechanism further includes a first elastic member sleeved to the mandrel, an end of the axial sleeve is abuttable against the first elastic member to compress the first elastic member; the abutting assembly includes a moving member having the second ratchet portion disposed thereon, the moving member is axially movable relative to the main body and is located at a side of the first elastic member opposite to the axial sleeve; the adjusting mechanism is located between the main body and the driving portion and further includes a restricting sleeve mounted to the main body, and the plurality of first engaging portions are equiangularly arranged on an inner circumferential wall of the restricting sleeve; a number of the plurality of first engaging portions is odd and larger than the number of the plurality of second engaging portions; the number of the plurality of first engaging portions is 5, the number of the plurality of second engaging portions is 3; an outer circumferential wall of the restricting sleeve has a plurality of cutting surfaces corresponding to an inner circumferential surface of the main body, every adjacent two of the plurality of cutting surfaces have an arcuate surface disposed therebetween; the positioning member includes a first indication portion, the restricting sleeve includes a second indication portion exposed out of the main body and corresponding to the first indication portion; the adjusting mechanism further includes an operating member sleeved with the adjusting member, the adjusting member includes a first restricting portion, the operating member includes a second restricting portion and is movable in the axial direction between a locked position and an unlocked position relative to the adjusting member; when the operating member is in the locked position, the first restricting portion is abutted against the second restricting portion in a rotational direction of the adjusting member; and when the operating member is in the unlocked position, the first restricting portion is free of interference with the second restricting portion in the rotational direction; the first restricting portion is a non-circular segment disposed on the axial sleeve, the second restricting portion is a non-circular hole disposed on the operating member; a second elastic member is disposed between the operating member and the positioning member, the operating member is partially sleeved with the positioning member; and the plurality of included angles includes at least one first included angle and at least one second included angle larger than the at least one first included angle, each of the at least one first included angle is an acute angle, and each of the at least one second included angle is an obtuse angle.

* * * * *